United States Patent
Horvath et al.

(10) Patent No.: US 8,432,106 B2
(45) Date of Patent: Apr. 30, 2013

(54) MICROCONTROLLER-OPTIMIZED PULSE-WIDTH MODULATION (PWM) DRIVE OF A LIGHT-EMITTING DIODE (LED)

(75) Inventors: Adam Horvath, Varpalota (HU); Hans Hoschopf, Jennersdorf (AT)

(73) Assignee: LedonLighting Jennersdorf GmbH, Jennersdorf (AU)

( * ) Notice: Subject to any disclaimer, the term of this patent is extended or adjusted under 35 U.S.C. 154(b) by 211 days.

(21) Appl. No.: 12/937,936

(22) PCT Filed: Apr. 6, 2009

(86) PCT No.: PCT/EP2009/002518
§ 371 (c)(1),
(2), (4) Date: Dec. 9, 2010

(87) PCT Pub. No.: WO2009/127340
PCT Pub. Date: Oct. 22, 2009

(65) Prior Publication Data
US 2011/0115396 A1    May 19, 2011

(30) Foreign Application Priority Data

Apr. 15, 2008    (DE) .................... 10 2008 018 808

(51) Int. Cl.
*H05B 41/00* (2006.01)
*G05F 37/02* (2006.01)

(52) U.S. Cl.
USPC ........................... 315/291; 315/185 R

(58) Field of Classification Search ............ 315/291, 315/307, 312, 292, 294, 185 S, 224
See application file for complete search history.

(56) References Cited

U.S. PATENT DOCUMENTS

| | | | | |
|---|---|---|---|---|
| 7,276,861 | B1 * | 10/2007 | Shteynberg et al. | 315/291 |
| 7,436,131 | B2 * | 10/2008 | Cottingim et al. | 315/309 |
| 7,675,250 | B2 * | 3/2010 | Chitta et al. | 315/309 |
| 2005/0082553 | A1 | 4/2005 | Yamamoto et al. | |
| 2006/0202914 | A1 | 9/2006 | Ashdown | |
| 2007/0108846 | A1 * | 5/2007 | Ashdown | 307/149 |
| 2007/0195024 | A1 | 8/2007 | Korcharz et al. | |
| 2007/0216615 | A1 * | 9/2007 | Itoh | 345/82 |

FOREIGN PATENT DOCUMENTS

WO    WO-2007096868 A1    8/2007

OTHER PUBLICATIONS

International Search Report for PCT/EP2009/002518 dated Oct. 26, 2009.

\* cited by examiner

*Primary Examiner* — Minh D A
(74) *Attorney, Agent, or Firm* — Marshall, Gerstein & Borun LLP

(57) ABSTRACT

A method for operating a controlled illumination apparatus, the illumination apparatus comprising at least one pulse-width modulation (PWM)-controlled LED, the method comprising carrying out a duty cycle sweep of the PWM signal driving the LED while sensing at least one parameter indicative of the power consumption of the LED to compute a curve reflecting the duty-cycle dependency of the power efficiency of the LED.

18 Claims, 5 Drawing Sheets

MICROCONTROLLER-OPTIMIZED PULSE-WIDTH MODULATION (PWM) DRIVE OF A LIGHT-EMITTING DIODE (LED)

FIELD OF THE INVENTION

The present invention relates to illumination apparatuses that drive an LED with a pulse-width modulation current. The present invention further yet relates to power saving configurations and methods for said microcontroller optimized illumination apparatuses such as LED strings driven by a pulse-width modulation.

BACKGROUND OF THE INVENTION

LEDs have very low dynamic resistance, with the same voltage drop for widely varying currents. Consequently, they cannot connect directly to most power sources without causing self destruction. Therefore, there is a need for driver circuits.

LED drivers control the amount of current and voltage supplied to light emitting diodes. Well known in the art are LED driver circuits that employ analog electronic components. But analog electronic circuitry presents a plurality of inconveniences, among others, the need for a lot of auxiliary electronic circuitry (capacitors, resistors, etc.), their setting being possible only by way of changing the active or passive components, and in some cases their accuracy being strongly correlated with the accuracy of the electronic components.

Therefore, there is a need for controller based electronics that replace the currently present and widely used LED driver circuits on the market, that have only analog electronic components.

The LED illumination device may have a digital controller to control the LED output. The controller could be a pulse width modulator, pulse amplitude modulator, pulse displacement modulator, resistor ladder, current source, voltage source, voltage ladder, voltage controller or other power controller.

The light output of an LED is proportional to the forward current, so if the go forward current (IF) is not controlled properly, it can result in an unacceptable variation in light output. Also, exceeding the manufacturer's maximum IF specification can seriously reduce the LED's useful life.

In another approach power control is available via pulse width modulation that uses a fixed frequency of period T. The dimming is achieved by varying the pulse width. Multiple luminosity levels can be achieved for multiple duty cycles. Power control is achieved via Frequency modulation by using the concept of a fixed-width control pulse. Pulse A is always of the same duration. The luminosity is controlled by how often Pulse A repeats itself. Power control can further be achieved by Bit Angle Modulation that is based on a binary pulse train that contains the intensity value. Every bit in the pulse train is stretched proportionally to its significance. If the least significant bit b0 has a duration of 1, then bit b1 has a duration of 2, bits b2 through b7 have durations of 4, 8, 16, 32, 64 and 128 respectively.

While the various advantages that the use of microcontrollers presents in connection with managing the performance of an LED string, a plurality of limitations still present.

As far as voltages and currents, if $V_{DD}$ is the supply to both the LED and the microcontroller, then there is only enough voltage to drive one LED. Simple topologies do not allow for the LED voltage to be higher than $V_{DD}$. For more LEDs in series such in a string, with the benefit of all being at the same current, $V_{DD}$ must be higher and requires a separate power supply for the microcontroller.

As far as the physical interfaces that support the communication, the microcontroller only provides simple synchronous (SPI) or asynchronous (SCI) communication. Additional hardware and software is needed to implement DALI, DMX, LIN and more. What is needed is a configurations that has less impact on cost, that is simple configuration for multiple LED's illumination apparatus.

As far as constant current regulation and switching speed, the key parameter in this application is switching speed. Larger inductors, which are more costly, are required for slower switching speeds. Most microcontrollers can accomplish an A/D conversion in about 15 μs. Add a few instructions to compare the read value to internal thresholds, and the conversion is up to 30 to 40 μs for the full analysis per ON or OFF cycle with an uncertainty of about 15 μs. This error dictates the minimum inductor value. Another approach is to set arbitrary ON and OFF durations, and then readjust these to try and accommodate the two current thresholds. This indirect method allows for a smaller, lower cost inductor, but it is less accurate. What are needed are accurate configurations for multiple LED's illumination apparatus.

As far as dimming and modulation speed, at 100 percent luminosity, there is no need to modulate the transistor. At the other extreme for the lowest luminosity level, i.e., one percent—it will be necessary to have the transistor on for one percent of the time. Given the fact that dimming must be done at 100 Hz or higher to avoid flickering, the PWM frequency must be 10 kHz or more. The eye can detect minute changes in the low luminosity range, and therefore 100 steps are not enough. If 4,000 steps were required (12-bit resolution), the PWM frequency would have to be around 400 kHz, which is almost impossible for a simple microcontroller.

Therefore the microcontroller based LED driver that would overcome the limitations discussed above has to at least provide solutions to the issued related to well-controlled, programmable, constant current source with high efficiency, processing speed and the impact on inductor size and dimming resolution, communication capability with industry standards, drive capability for multiple outputs and/or LED strings.

Several attempts have been made in the art to resolve the above referenced drawbacks and provide an optimal design for the microcontroller.

A proposed solution is illustrated by US 2007/0247305 A1 that teaches the use of a microcontroller for controlling LEDs by transmitting a 'signature' indicating the type of LED present. The optimum (nominal) current for the diode is then set using the transmitted signature information.

Therefore, based on all of the above, what is needed, specifically, is a system and method that remedies one or more of the drawbacks mentioned above in connection with the art.

What is needed is an electronic circuitry with power saving capabilities that at the same time allow for better thermal management. Further, what is needed is an algorithm to govern, control the LED power saving driving. At least two types of solutions are envisioned, a product and/or a measurement system providing an optimized driving and optimized thermal management.

Therefore the objective technical problem resolved by the present invention can be regarded at least as providing for an improved optimization apparatus and method for the total energy consumption of an illumination apparatus.

A further objective technical problem resolved by the present invention can be regarded at least as providing for said improved optimization apparatus and method for the total energy consumption of the LED string by calculating and optimizing a plurality of circuit parameters, for example the driving current, the modulation frequency, and the duty cycle of the PWM control.

These objective technical problems are solved by the present invention in accordance with the features of the independent claims. The dependent claims further develop the central concept of the invention in particularly advantageous ways.

SUMMARY OF THE INVENTION

The present invention proposes a controlled illumination apparatus that comprises at least a plurality of diode lamps, the plurality of diode lamps being disposed in a predefined configuration and a microcontroller, that comprises at least data acquisition and processing means for a plurality of illumination apparatus characteristics, wherein a nominal duty cycle range with an allowable minimum and an allowable maximum value for the duty cycle is preset. Alternatively, a plurality of duty cycle ranges corresponding to a plurality of different temperatures is preset. The preset nominal duty cycle range and a plurality of duty cycle ranges are stored in the microcontroller. The plurality of diode lamps and the microcontroller may be situated remotely from each other, and communicate via a plurality of communication beams and interfaces. The plurality of illumination apparatus characteristics comprises at least current, power intensity, frequency, and temperature. The predefined configuration of plurality of diode lamps further comprises a temperature sensor, and the duty cycle is chosen as a function of the temperature provided by the temperature sensor. The microcontroller receiving data from the data acquisition and processing means and adjusting is supplying a current to the plurality of diode lamps as a function of the data. The predefined configuration of plurality of diode lamps is an LED string.

The present invention further proposes a power optimization method for an illumination apparatus that comprises operating initially the illumination apparatus at a low duty cycle, continuously increasing the duty cycle and measuring feedback signals corresponding to each increase, computing power consumption levels based on a ratio of the light intensity per Watt; and performing a duty cycle sweep by a microcontroller upon each reset, wherein a nominal duty cycle range with an allowable minimum and an allowable maximum value for the duty cycle is preset. The microcontroller stores the power efficiency per duty cycle curve. The preset values for the allowed duty cycle insure that the subsequent operation of said illumination apparatus will be carried out in said optimized duty cycle range. A plurality of duty cycle ranges corresponding to a plurality of different temperatures are as well preset.

BRIEF DESCRIPTION OF THE DRAWINGS

The following drawing figures depict certain illustrative embodiments of the invention in which like reference numerals refer to like elements. These depicted embodiments are to be understood as illustrative for the invention and not as limiting, in any way.

DETAILED DESCRIPTION OF THE PREFERRED EMBODIMENTS

Figure 1:
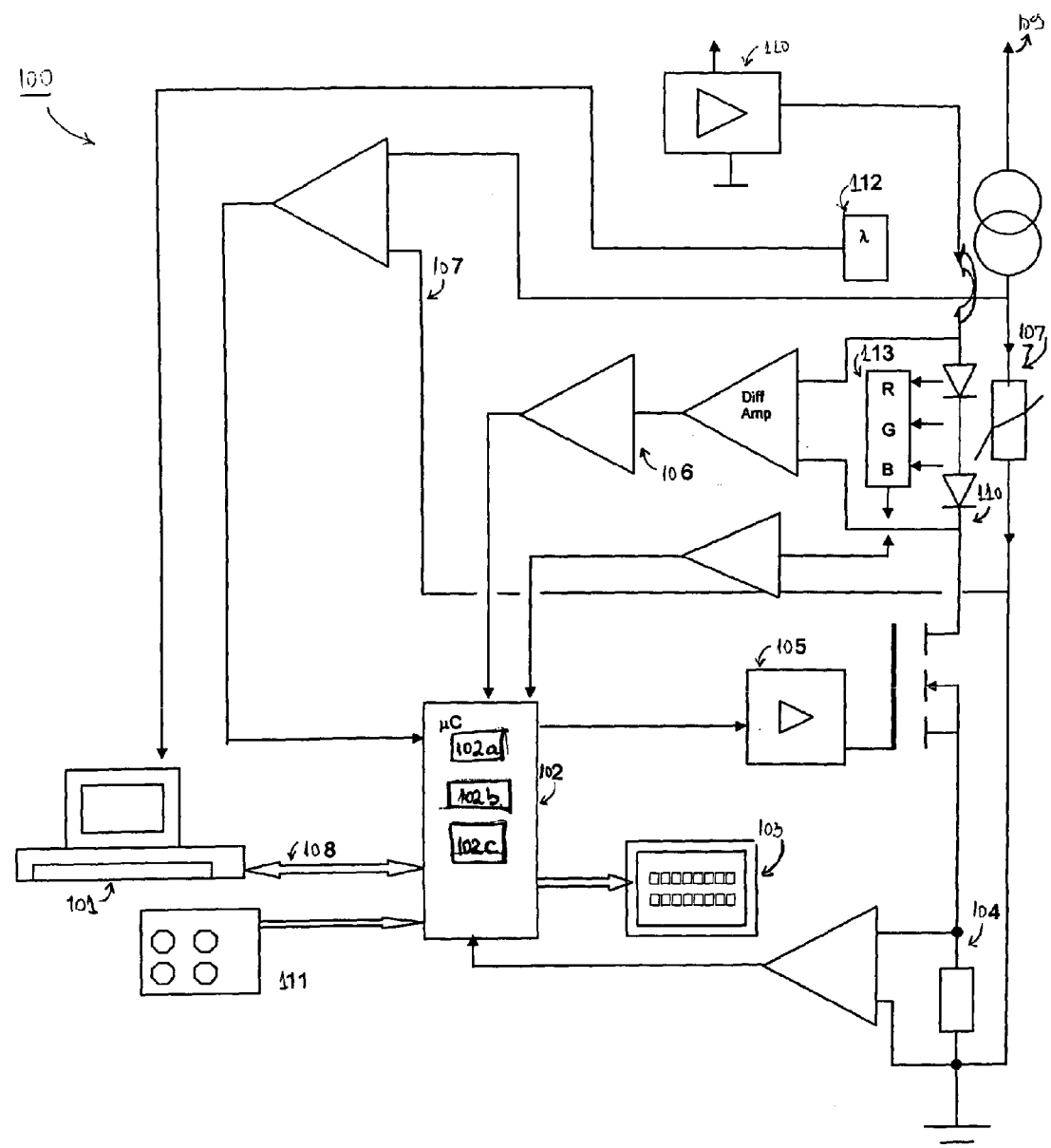
FIG. 1 is a block diagram for an illumination apparatus, implemented according to the principles of the present invention.

The description below pertains to several illustrative embodiments of the invention. Although many variations of the invention may be envisioned by one skilled in the art, such variations and improvements are intended to be encompassed within this disclosure. Thus, the scope of the invention is not to be limited in any way by the disclosure below.

As used herein, the terms "LED" or "diode lamps", further in this document used interchangeably, mean any system that is capable of receiving an electrical signal and producing a color of light in response to the signal. Thus, the term "LED" should be understood to include light emitting diodes of all types, light emitting polymers, semiconductor dies that produce light in response to current, organic LEDs, electroluminescent strips, and other such systems. In an embodiment, an "LED" may refer to a single light emitting diode package having multiple semiconductor dies that are individually controlled. In a different embodiment, an "LED" may refer to multiple LEDs that are connected in series or in parallel. In a further embodiment, an LED may refer to an LED string. It should also be understood that the term "LED" or the term diode lamps does not restrict the package type of the LED. The term "LED" includes packaged LEDs, non-packaged LEDs, surface mount LEDs, chip on board LEDs, and LEDs of all other configurations.

LEDs are current-operated devices that must be driven at a specified current to achieve predictable luminosity and chromaticity levels. The luminosity can be controlled using pulse-width modulation (PWM) which will not affect the chromaticity.

For the purposes of the present invention, a "processor" or "processing means" further in this document used interchangeably, may include a microprocessor, microcontroller, programmable digital signal processor, other programmable device, a controller, addressable controller, addressable microprocessor, computer, programmable processor, programmable controller, dedicated processor, dedicated controller, integrated circuit, control circuit or other processor. A processor may also, or instead, include an application specific integrated circuit, a programmable gate array, programmable array logic, a programmable logic device, a digital signal processor, an analog-to-digital converter, a digital-to-analog converter, or any other device that may be configured to process electronic signals. In addition, a processor may include discrete digital components such as logic components, shift registers, latches, or any other separately packaged chip or other component for realizing a digital function. Any combination of the above circuits and components, whether packaged discretely, as a chip, as a chipset, or as a die, may be suitably adapted to use as a processor as described herein. It will further be appreciated that the term processor may apply to an integrated system, such as a personal computer, network server, or other system that may operate autonomously or in response to commands to process electronic signals such as those described herein. Where a processor includes a programmable device such as the microprocessor or microcontroller mentioned above, the processor may further include computer executable code that controls operation of the programmable device.

The "controller" or a "microcontroller" may be a pulse width modulator, pulse amplitude modulator, pulse displacement modulator, resistor ladder, current source, voltage source, voltage ladder, switch, transistor, voltage controller, or other controller, the microcontroller may or may not be integrated in a computer. The controller controls the current, voltage or power through the LED. The controller also has a signal input wherein the controller is responsive to a signal received by the signal input. The signal input is associated with the processor such that the processor communicates signals to the signal input and the controller regulates the current, voltage and/or power through the LED. In an embodiment, several LEDs with different spectral outputs may be used. Each of these colors may be driven through separate controllers. The processor and controller may be incorporated into one device. This device may power capabilities to drive several LEDs in a string or it may only be able to support one or a few LEDs directly. The processor and controller may also be separate devices. By controlling the LEDs independently, color mixing can be achieved for the creation of lighting effects.

To achieve the objectives of the present invention, "electronic memory" may also be provided. The memory is capable of storing algorithms, tables, or values associated with the control signals. The memory may store programs for controlling the LEDs or the processor. The memory may be memory, read-only memory, programmable memory, programmable read-only memory, electronically erasable programmable read-only memory, random access memory, dynamic random access memory, double data rate random access memory, Rambus direct random access memory, flash memory, or any other volatile or non-volatile memory for storing program instructions, program data, address information, and program output or other intermediate or final results.

A program, for example, may store control algorithms to operate in a microcontroller. A user interface may also be associated with the processor. The user interface may be used to select a program from memory, modify a program from memory, modify a program parameter from memory, select an external signal, initialisation or provide other user interface solutions.

The processor can also be addressable to receive programming signals addressed to it. Another "interface" is an interface that is associated with a power source.

An energy storage element can be associated with a power source. The energy storage device can also be associated with a processor. The energy storage element may be a capacitor, non-volatile memory, battery backed memory, relay, storage device or other energy storage element. The element may communicate a logic high and a logic low signal to the processor depending on the state of the element. For example, the element may communicate a low logic signal when the device is connected to the power source and a high logic signal when the device is disconnected from the power source. The high logic signal may change to a low logic signal following a predetermined period of time and the processor may be monitoring the signal. The lighting device could be programmed such that a last lighting program may be operating when the device is de-energized. If the device is re-energized within a predetermined period, while the logic signal is still high, the device may select a new program from memory to execute. If the device is not re-energized within the predetermined period, the device may start up in the last lighting program or a default program. A non-volatile memory, battery backed memory or other memory may be provided such that the last program is remembered. The technique can be used to change the program, a program parameter or other setting. This technique can be used in a device that does not include a separate user interface by turning the power to the lighting device off and on. A separate switch could also be employed to provide the user interface as well as an on/off switch.

For the purposes of the present invention any or all of the above referenced devices will be understood as being included in the exemplary embodiments of the present invention.

For the purposes of the present invention white LED and PWM LED drivers with analog dimming possibility are of interest in exemplary embodiments.

Typically, the illumination apparatus comprises a temperature sensor. In a non-limiting embodiment, the temperature sensor is arranged on the hottest point of the lighting module. The temperature measuring circuitry may also be, in another non-limiting arrangement, a stand-alone measurement element.

FIG. 1 is a block diagram for an illumination apparatus, implemented according to the principles of the present invention.

The electronic circuitry pertaining to an illumination apparatus with power optimization capabilities and optimized thermal management capabilities, proposed by the present invention, will be discussed further in connection with the electronic circuitry illustrated in FIG. 1. The algorithm that governs and controls the LED power saving driving will be as well illustrated in connection with the exemplary embodiment of the invention shown in FIG. 1. Product and/or a measurement system providing an optimized driving and optimized thermal management will also be discussed further in connection with the implementation shown in FIG. 1.

In connection with the circuitry of FIG. 1 will also be discussed an improved power optimization apparatus and method for the total energy consumption of the LED string illumination apparatus by calculating and optimizing a plurality of circuit parameters, for example the driving current, the modulation frequency, and the duty cycle of the PWM control.

The example circuitry for the illumination apparatus 100 comprises, but it is in no way limited to, element 101 that is a personal computer employed for visualization and programming of a microcontroller 102, element 102 that is a microcontroller for data acquisition and data transmission between the PC and the lighting system as well as for PWM control, element 103 LCD for function signaling, element 104 that is a current measurement device such as e.g. a shunt, element 105 is a driver for driving a switch (e.g. transistor) 105' in response to PWM signals supplied by the μC 102, element 106 is a forward voltage measurement apparatus, element 107 is a temperature measuring circuitry, element 108 is a communication link such as e.g. a RS-232 Half duplex communication link, element 109 is an LED string comprising one or more LEDs, element 110 is a constant current supply for LED string, element 111 is a manual interface such as e.g. a push button block for parameter choosing and parameter setting should the computer be abandoned for PWM control, element 112 is an external wave length measurement device for light power calculation, and element 114 is a photo diode measurement element for light power sensing.

The computer 101 for visualization and programming can be either manually or automatically operated according to the measured values, and according to the control strategy.

Personal computer for visualization and programming 101 and microcontroller 102 may be implemented in accordance with or comprise elements that have been described earlier in this document while discussing a "processor", a "controller" or "microcontroller" and an "electronic memory" and may be outfitted with devices discussed earlier in the document as operational implementations for an "interface" and control and calculation software comprised therein. Furthermore the computer can assure the possibility for the input of external wavelength parameter measurements towards the microcontroller, microprocessor, DSP, etc.

In the following, a light power measurement and calculation algorithm is discussed.

The light power is measured by using photo diodes, for example, with the help of a device like device 112 that measures light intensity.

Each photo diode has an individual A/W value for its nominal wavelength, where A denotes the current flowing depending on the sensed light power W.

The photo diode current A can be measured by using for instance instrumental amplifiers and the light power can be calculated after a current to voltage conversion as a parameter of V/W, where V denotes voltage.

The light flux and hence the light power must be calibrated. This is accomplished by using external laboratory equipment, not explicitly shown in connection with apparatus of FIG. 1.

For each photodiode, after gaining has an individual V/W (λ) characteristic, the look-up table is prepared in the requested wave length range, because an embedded multiplication shall be necessary with the input of the wave length parameter. By using an external wavelength measurement system, this can be solved.

The following mathematical formulas are used for calculating the emitted light power calculation:

$$V_{Amplifier}(I_{Diode})=KI_{Diode}$$

$$W_{light}=V_{Amplifier}(\lambda)=K_{Lookup}V_{Amplifier} \quad (1)$$

Where $V_{Amplifier}$ denotes voltage at the amplifier, $I_{Diode}$ denotes forward current per diode, K denotes a power coefficient, $W_{light}$ denotes light power, λ denotes wave length and $K_{Lookup}$ denotes power coefficient stored in a look up table, and $V_{Amplifier}(\lambda)$ is the spectral luminous efficiency function.

For the purposes of simplifying the calculation algorithm for the light power, optimally a range is chosen with the assistance of a quasi-linear curve.

Current measurement element 104 measures the LED string 109 forward current, and said measurement is fed back to the microcontroller 102. The current through the LED string 109 is initially preset to the nominal current value for the specific LEDs that make up the string.

Element for forward voltage measurement 106 measures the voltage across the LED string, and feeds back this information to the microcontroller 102. Based on these values a processing element 102c for example comprised by the microcontroller 102, employing an algorithm that makes use of the mathematical formulas for carrying out the above calculation, ideally calculates the electrical energy consumed by the LED string.

Microcontrollers are to be used since they exhibit possibilities for free choosing of control algorithm, free compensation of the offsets, they have acceptable resolution for sensing the required parameters, in sum they are a viable alternative when "programming" the sensed forward current or temperature in an illumination apparatus.

The control algorithms housed therein as shown above in microcontroller 102 can be based on the power control, which is the product of the sensed forward current and the sensed voltage at the LED string.

Furthermore, the microcontroller solution is applicable for power saving solutions with traditional control (PID), or in lookup-table control algorithms.

For additional feedback, there is also the possibility of integrating in the illumination apparatus a three stimuli RGB (red green blue) sensor, or a light intensity sensor feedback such as 112.

The PWM duty cycle method is employable for the power calculation, and using a digital multiplication algorithm, that might be resident on microcontroller 102 the consumed power can be calculated.

Further, for additional comparisons, the ratio can be calculated between the electrical power, the temperature, and the emitted light amount.

For the calculation of electrical power parameter that might be of interest, the following can be used:

$$\begin{cases} U_{eff} = \sqrt{f \int_0^{\frac{D}{f}} u(t)\,dt} = \sqrt{D}\,\hat{U} \\ I_{eff} = \sqrt{f \int_0^{\frac{D}{f}} i(t)\,dt} = \sqrt{D}\,\hat{I} \end{cases} \Rightarrow P_{electrical} = D\hat{U}\hat{I} \quad (2)$$

Where $U_{eff}$ denotes effective voltage, f denotes frequency, t denotes time, D denotes junction coefficient, $I_{eff}$ denotes forward current per diode, and $P_{electrical}$ denotes supplied electrical power.

The electrical power parameter takes into account the energy dissipated by thermal effect. The control of the duty cycle is available in the microcontroller proper register.

The digital operations subscribed to the calculation of the electrical power in the embedded software are solved in the software embedded in the microcontroller.

An optimum temperature range (between a minimum and a maximum temperature) is preset. The temperature is controlled and the actual temperature of the LED string, measured by element 107, is fed back to the microcontroller 102. The optimum temperature is maintained within this range by adaptively changing the duty cycle and the frequency of the PWM control, as it will be further explained in detail in connection with the methods of the present invention.

Temperature control can be achieved either by retrieving information from a pre-defined table stored, for example, in the memory of the microcontroller, or by alleatorily choosing while employing parameter processing method. If the first methodology is employed, in order to improve the accuracy or/stability of temperature management, three or four wire measurement devices are employed.

It will be appreciated by one skilled in the art that there are many types of personal computers for visualization and PWM control, microcontrollers for data acquiring and data transmission between PC and lighting system, LCDs for function signaling, current measurement elements, LED string driving circuitry, forward voltage measurement apparatuses, temperature measuring circuitry, communication links, LED strings, constant current supplies for the LED string, push button blocks for parameter choosing and parameter setting in case the computer, wave length measurement devices, and photo diode measurements element for light power calculation that could be used for the practical implementation of the illumination apparatus of the invention, and the present invention is not limited to the express examples given herein. It will be further appreciated that the configuration of the illumination system presented in FIG. 1 is not limited by the example given herein, and many variations along the principles of the present invention can be envisioned by the person skilled in the art.

Figure 2:
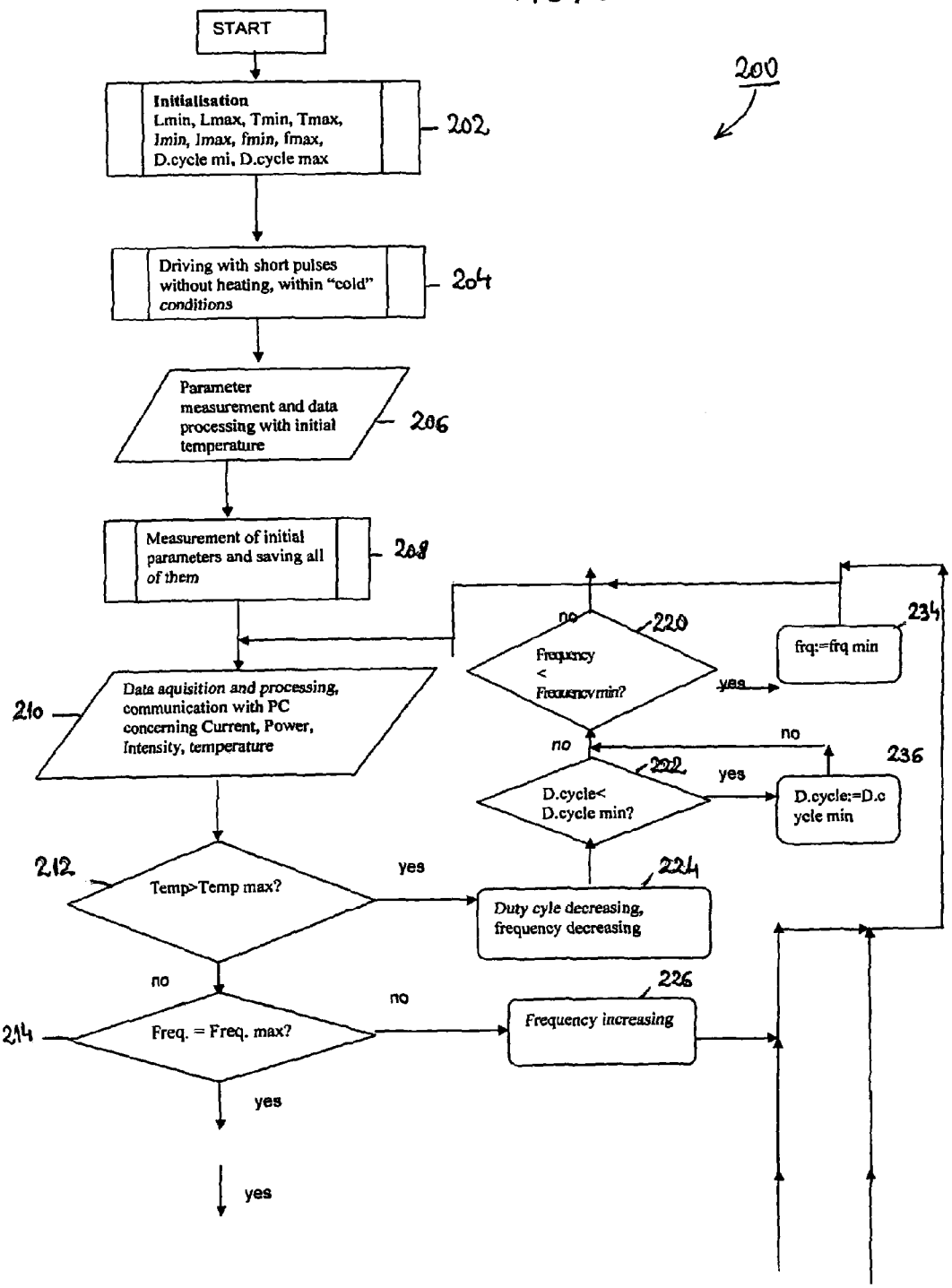
FIG. 2 is a block diagram of with the method of the present invention.
Figure 2:
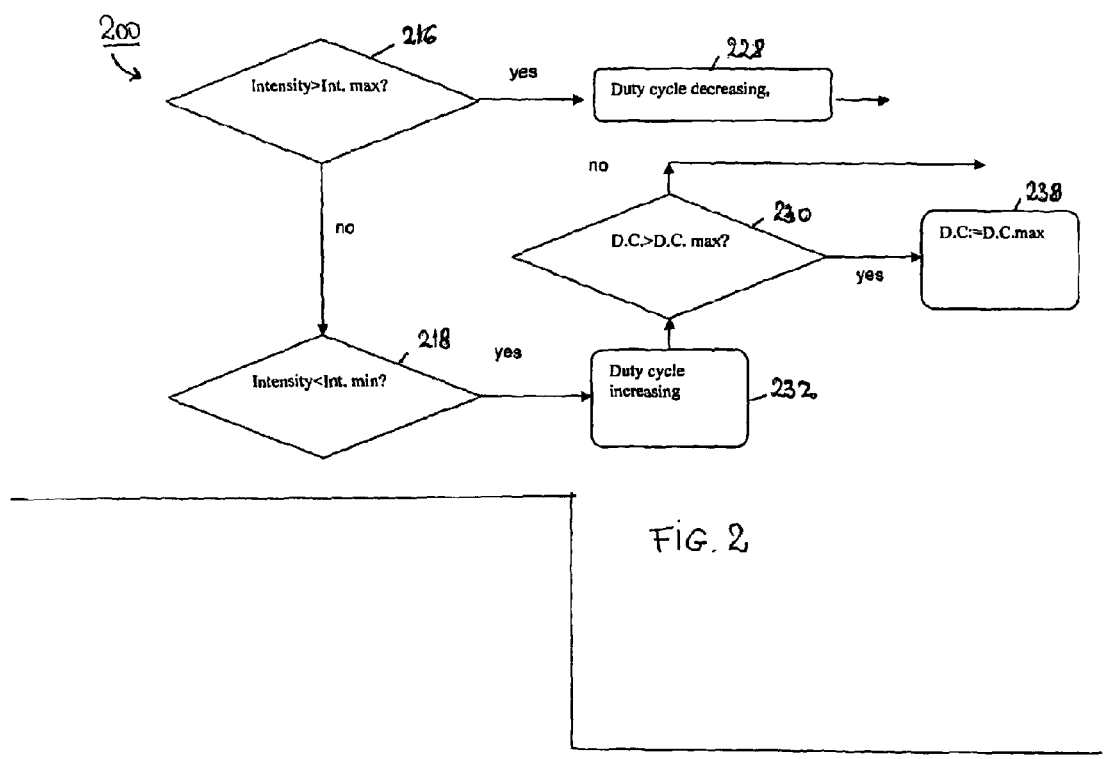

FIG. 2 is a block diagram of with the method of the present invention.

Method 200 comprises in an illustrative, non limiting embodiment an initialization step 202 where $L_{min}$, $L_{max}$, $T_{min}$, $T_{max}$, $I_{min}$, $I_{max}$, $f_{min}$, $f_{max}$, $D_{cycle\ mi}$, $D_{cycle\ max}$ are retrieved from their respective look up tables or measured in accordance with the sequence of steps from ranging 204 to 210.

In step 204 illumination apparatus is being PWM driven with short pulses (i.e. low duty cycle) without heating, within "cold" conditions. Subsequently, in step 206 parameter measurement and data processing at and taking into account the initial temperature occurs. Further, in step 208, measurement of initial parameters and their saving to a memory occurs. Based on all of the above in step 210 data acquisition and processing, and communication with the PC concerning the current, power, intensity, and temperature determined as above takes place.

It is estimated, in the following step 212, if the measured temperature is larger than the preset maximum temperature for the illumination apparatus. If no, then the system proceeds to estimate, in step 214, if the frequency has reached or not the level of maximum frequency. If the result of the estimation made in step 212 is that the measured temperature is larger than the preset maximum temperature, in the subsequent step 222, the duty cycle is decreased and the frequency is decreasing as well. Further to said decrease, it is evaluated in subsequent step 222 if the duty cycle is smaller than the minimum duty cycle. If the duty cycle is found to be larger than the minimum set duty cycle, the controller controls said apparatus duty and regulates it such that the duty cycle will become equal to the minimum duty cycle, in step 236. Whether the duty cycle was found smaller than the cycle minimum duty cycle in step 222, or it has been regulated in step 236, the processor proceeds to review the frequency versus the minimum frequency in step 220. If the frequency is found to be smaller than the minimum frequency then the processor regulates the frequency in step 234. Whether the frequency has been regulated in step 234 or has been found larger than the minimum frequency in step 220, the processor will revert back to step 210 to assess if the temperature of the system is larger than the maximum temperature.

Whether the temperature was found to be smaller than the maximum temperature in step 212 or it has been regulated by the sequence of steps discussed above, the system proceeds to assess if the frequency has reached its maximum value. If the maximum frequency has not been reached the processor regulates the frequency by increasing it to the desired level and the control cycle reverts back to pre-step 210. If the frequency is equal with the maximum frequency, the system assesses in step 216 whether or not the intensity is larger than the maximum intensity. If yes, duty cycle decreasing is in order in a subsequent step 228, the control elements accomplishing said decrease in step 228 before the control cycle reverts back to pre-step 210. If the intensity is not larger than the maximum intensity, the system assesses whether the intensity is smaller than the minimum intensity in step 218. Should the intensity be smaller than the minimum intensity, the control loop proceeds to increase the duty cycle in step 232. It is assessed if the duty cycle is larger than the maximum duty cycle, in step 230, and if it is not then in step 238 the control element regulates the duty cycle to be equal to the maximum duty cycle. Once this is accomplished, the control cycle reverts back to preset 210.

In FIG. 2, D.C. denotes duty cycle, $T_{MIN}$ denotes the minimum temperature, $T_{MAX}$ denotes the maximum temperature, Int. denotes intensity, Freq. denotes frequency, $L_{min}$ denotes light intensity minimum, $L_{max}$ denotes light intensity maximum, $I_{min}$ denotes minimum electrical current, $I_{max}$ denotes maximum electrical current, $f_{min}$ denotes minimum frequency, and $f_{max}$ denotes maximum frequency.

As illustrated above in connection with method 200 parameters such as the driving current, the modulation frequency and the duty cycle of the PWM control are calculated in order to optimize the total energy consumption for the LED string.

In the flowchart 200 of FIG. 2, the frequency and the duty cycle of the PWM control is set. However, the current through the LED string is only initially preset to the nominal current for the LEDs.

Furthermore, an optimum temperature range (between a minimum and a maximum temperature) is preset and it is controlled such that the actual temperature of the LED string is within this range by adaptively changing the duty cycle and the frequency of the PWM control.

Furthermore still, a light intensity range between $L_{min}$ and $L_{max}$ can be preset and by adaptively setting the duty cycle (within an allowed duty cycle range between $Dcycle_{min}$ and $Dcycle_{max}$) the intensity is controlled to be in the allowed intensity range.

In order to imply the power saving policy, the microcontroller, upon each reset, may perform a duty cycle sweep. In other words, the microcontroller starts to operate the LED string with a relatively low duty cycle and continuously increases the duty cycle, all by measuring the feedback signals and computing the corresponding power consumption values, for example expressed by the ratio of the light intensity per watt.

At the end of this duty cycle sweep, the microcontroller has stored the power efficiency per duty cycle curve and can then preset the ranges for the allowed duty cycle in order to make sure that in the following operation of the LED string the operation will be carried out in this optimized duty cycle range. Therefore, the flowchart shown in FIG. 2 is a control policy carried out after an initial duty cycle sweep. The microcontroller stores a characteristic curve for the power efficiency depending on the duty cycle.

EXAMPLE EMBODIMENTS

An exemplary practical implementation of the circuitry discussed in connection with FIG. 1 is employing Microchip microcontroller 16F870/16F871/16F877 (Trademark of Microchip) which has the adequate number of AD channels.

For parameter signing an LCD module is connected to microchip. It can be used for signing the temperature, the current, the voltage, the consumed electrical power, the power saving, the RGB values and so on.

For the purposes of pre-setting the illumination apparatus an RS232 port is employed. It offers possibilities for two way pre-setting, such as half duplex communication, or visualization, among others.

The control algorithm of the frequency and the duty cycle can be based of traditional control algorithms or based on look-up tables.

The circuitry solution has the benefit that when applying of other applications with different parameters, it is not necessary to change the components of the circuit physically; it is enough to modify the parameters by using an external PC. When the application needs continuous supervising, the PC can be the platform of control and the microcontroller can have interface role or behaviour.

The circuitry further comprises push-buttons for parameter and function setting.

As it will be illustrated further in connection with FIGS. 3 to 7, the main difference of Ix/W or Im/W values for the power and efficiency saving reasons can be seen for both cases of PWM driven and traditional DC current driven LED modules.

DC equivalent currents are used, where the effective value of the PWM drawn current is:

$$I_{\mathit{eff\_PWM}} = \sqrt{\sqrt{D}I_0} \qquad (3)$$

This DC equivalent current is used for the comparison between the operations of PWM and DC equivalent LED.

Numerical results can be seen in the following table:

| Duty cycle | Ix_Error_DC in % | Ix_Error_PWM in % | Ix/W_Error_DC in % | Ix/W_error_PWM in % |
|---|---|---|---|---|
| 10% | 39.759 | 81.928 | −105.911 | −80.723 |
| 20% | 25.301 | 69.880 | −76.546 | −50.602 |
| 30% | 15.663 | 61.446 | −60.548 | −28.514 |
| 40% | 9.639 | 51.807 | −47.435 | −20.482 |
| 50% | 7.229 | 39.759 | −34.555 | −20.482 |
| 60% | 4.819 | 27.711 | −25.253 | −20.482 |
| 70% | 2.410 | 15.663 | −18.296 | −20.482 |
| 80% | 1.205 | 4.819 | −11.345 | −18.976 |
| 90% | 1.206 | 1.807 | −4.452 | −9.103 |
| 100% | 0.000 | 0.000 | 0.000 | 0.000 |

Figure 3:
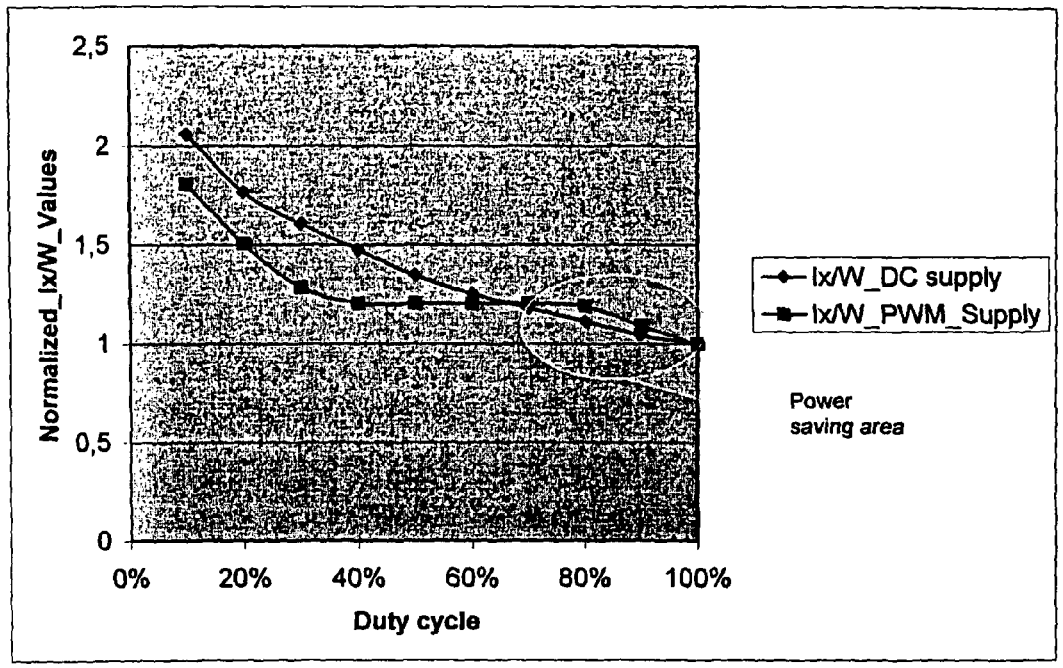
FIG. 3 illustrates a chart plotting the normalized $I_x/W$ values in the function of the duty cycle where the controlled illumination apparatus is a white LED string.
Figure 4:
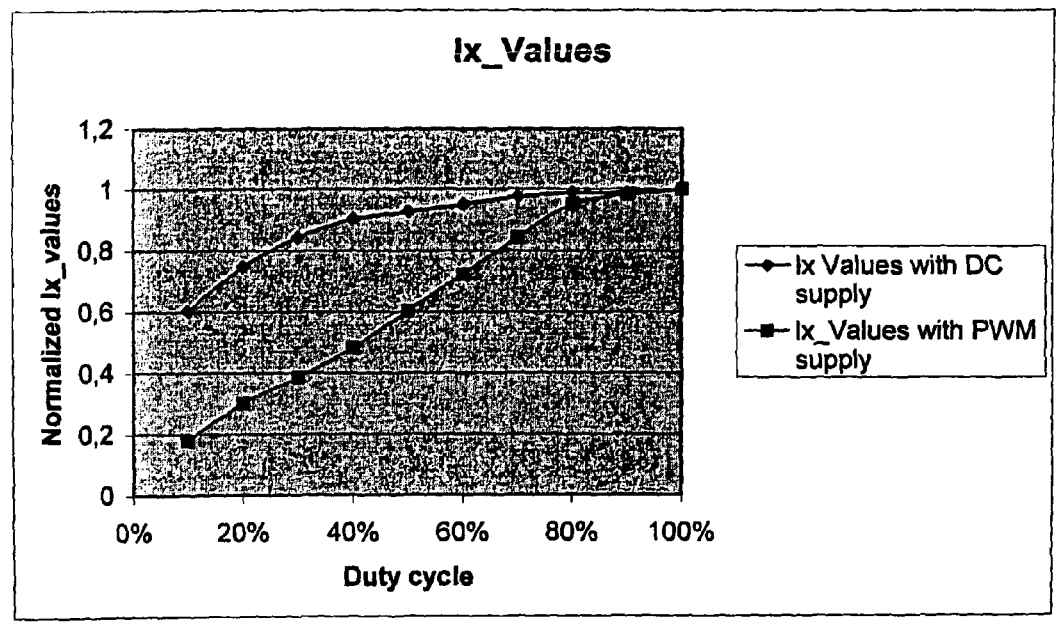
FIG. 4 illustrates a chart plotted the normalized $I_x$ values in the function of the duty cycle where the controlled illumination apparatus is a white LED string.
Figure 5:
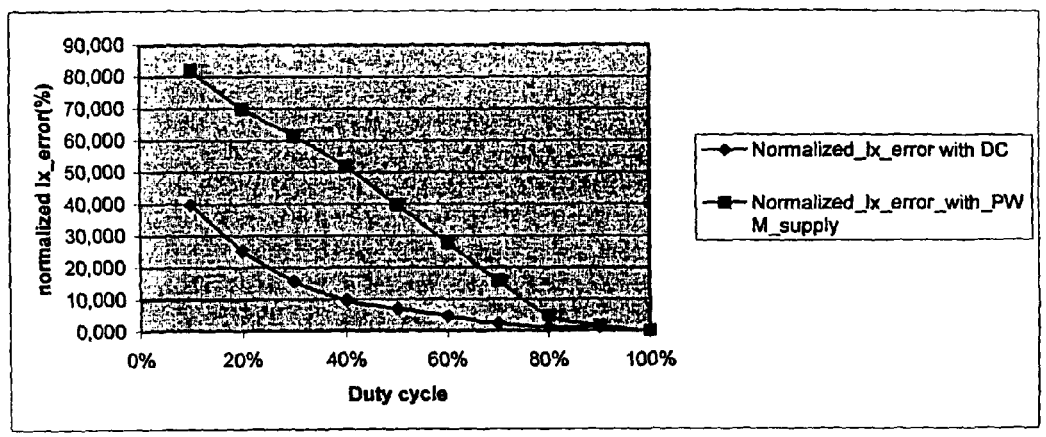
FIG. 5 illustrates a chart plotting the normalized $I_x$ differences in the function of the duty cycle, where the controlled illumination apparatus is a white LED string.
Figure 6:
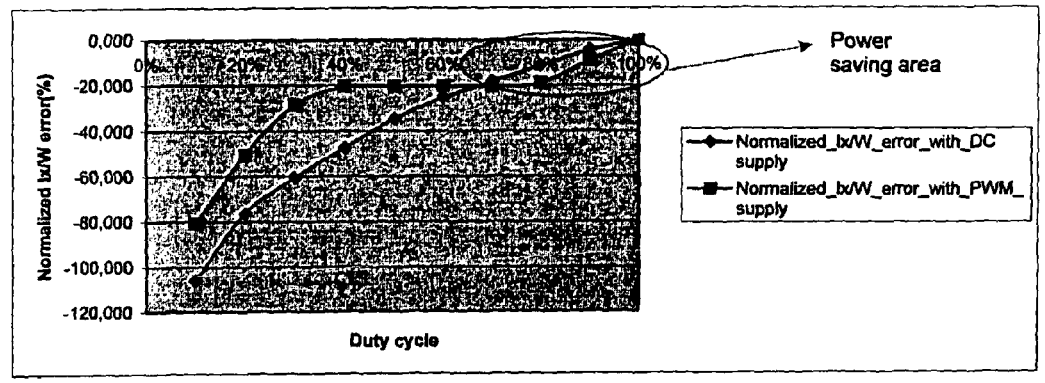
FIG. 6 illustrates a chart plotting the normalized $I_x/W$ differences in the function of the duty cycle, where the controlled illumination apparatus is a white LED string.

Based on the data highlighted in the above table, charts of FIGS. 3 to 7 were plotted. Therefore, FIG. 3 illustrates a chart plotting the normalized $I_x$/W values in the function of the duty cycle where the controlled illumination apparatus is a white LED string, FIG. 4 illustrates a chart plotted the normalized $I_x$ values in the function of the duty cycle where the controlled illumination apparatus is a white LED string, FIG. 5 illustrates a chart plotting the normalized $I_x$ differences in the function of the duty cycle, where the controlled illumination apparatus is a white LED string, FIG. 6 illustrates a chart plotting the normalized $I_x$/W differences in the function of the duty cycle, where the controlled illumination apparatus is a white LED string.

The following can be observed after evaluating the table/charts:
that power saving can be an appropriate solution for the PWM driven LED modules with duty cycle values between 80% and 100%, and
using variable frequency values with different duty cycles can improve the thermal management of the illumination circuitry.

One immediate application of all the principles discussed above in connection with the present invention is the applicability of this approach when manufacturing an LED control. LED illumination products with preset duty cycle range settings would be manufactured and sold.

However, especially in applications with widely varying temperatures, the temperature sweep functionality of the microcontroller can be carried out during the actual operation.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the claims set forth hereinafter.

The invention claimed is:

1. A controlled illumination apparatus, comprising:
at least one LED, and
a control unit designed for driving at least one light-emitting diode (LED) with a pulse-width modulation (PWM) signal,
wherein a nominal duty cycle range with an allowable minimum and an allowable maximum value for the duty cycle of the PWM signal is preset, and the control unit is adapted to carry out a duty cycle sweep of the PWM signal driving at least one LED while sensing at least one parameter indicative of the power consumption of at least one LED to compute a curve reflecting the duty-cycle dependency of the power efficiency of the at least one LED.

2. The controlled illumination apparatus of claim 1, wherein a plurality of duty cycle ranges, respectively one for a defined temperature or temperature range is preset.

3. The controlled illumination apparatus claim 1, wherein said preset nominal duty cycle range is stored in said control unit.

4. The controlled illumination apparatus of claim 1, wherein the control unit senses at least one of LED current, LED light power intensity, LED voltage, and temperature.

5. The controlled illumination apparatus of claim 1, wherein said duty cycle, frequency, and current are chosen as a function of the temperature provided by a temperature sensor.

6. The controlled illumination apparatus of claim 1, comprising a plurality of LEDs.

7. The controlled illumination apparatus of claim 6, wherein the plurality of LEDs is an LED string.

8. A method for operating a controlled illumination apparatus,
the illumination apparatus comprising at least one pulse-width modulation (PWM)-controlled light-emitting diode (LED),
the method comprising:
carrying out a duty cycle sweep of a PWM signal driving at least one LED while sensing at least one parameter indicative of the power consumption of the at least one LED to compute a curve reflecting the duty-cycle dependency of the power efficiency of the at least one LED.

9. The method according to claim 8, comprising storing values reflecting a power-efficient duty cycle range.

10. The method according to claim 9, comprising storing a nominal duty cycle range with an allowable minimum and an allowable maximum value for the duty cycle.

11. The method according to claim 9, wherein said stored values for the allowed duty cycle insure that the subsequent operation of said illumination apparatus will be carried out in said optimized duty cycle range.

12. The method according to claim 8, which is carried out upon resetting a control unit of the illumination apparatus.

13. The method according to claim 8, comprising storing a power efficiency per duty cycle curve besides the comparison with the equivalent analog current value.

14. The method for according to claim 8, comprising storing a plurality of duty cycle and frequency values corresponding to a plurality of different temperatures.

15. An integrated circuit designed for carrying out a method according to claim 8.

16. The integrated circuit of claim 15 comprising a microprocessor or an application-specific integrated circuit ASIC.

17. A computer software program product, implementing a method according to claim 8 when run on a computing device.

18. The controlled illumination apparatus of claim 1, wherein the control unit is a microprocessor.

\* \* \* \* \*